United States Patent
Liao

(10) Patent No.: US 7,562,566 B2
(45) Date of Patent: Jul. 21, 2009

(54) TIRE PRESSURE GAUGE WITH DISPLACEMENT LIMITING MEMBERS

(75) Inventor: Ming-Kuan Liao, Hsinchu County (TW)

(73) Assignee: Mobiltron Electronics Co,. Ltd., Taichung Hsien (TW)

( * ) Notice: Subject to any disclaimer, the term of this patent is extended or adjusted under 35 U.S.C. 154(b) by 0 days.

(21) Appl. No.: 11/826,078

(22) Filed: Jul. 12, 2007

(65) Prior Publication Data
US 2008/0257028 A1 Oct. 23, 2008

(30) Foreign Application Priority Data
Apr. 20, 2007 (CN) .................. 2007 2 0143234

(51) Int. Cl.
*G01M 17/02* (2006.01)
(52) U.S. Cl. ........................ 73/146; 73/146.3
(58) Field of Classification Search ......... 73/146–146.8
See application file for complete search history.

(56) References Cited

U.S. PATENT DOCUMENTS

| | | | | |
|---|---|---|---|---|
| 5,844,131 | A * | 12/1998 | Gabelmann et al. | 73/146.8 |
| 6,055,855 | A * | 5/2000 | Straub | 73/146.8 |
| 6,101,870 | A * | 8/2000 | Kato et al. | 73/146.8 |
| 6,557,406 | B2 * | 5/2003 | Gabelmann | 73/146.5 |
| 6,591,672 | B2 * | 7/2003 | Chuang et al. | 73/146.8 |
| 6,655,203 | B2 * | 12/2003 | Hsu | 73/146.8 |
| 6,672,150 | B2 * | 1/2004 | Delaporte et al. | 73/146.2 |
| 6,722,409 | B1 * | 4/2004 | Martin | 152/427 |
| 6,805,001 | B2 * | 10/2004 | Luce | 73/146.8 |
| 6,862,929 | B2 * | 3/2005 | Luce | 73/146.8 |
| 6,912,897 | B2 * | 7/2005 | Luce | 73/146.8 |
| 6,945,104 | B2 * | 9/2005 | Uleski | 73/146.8 |
| 7,040,155 | B1 * | 5/2006 | Lundell et al. | 73/146.8 |
| 7,145,443 | B2 * | 12/2006 | Ito et al. | 340/442 |
| 7,281,421 | B2 * | 10/2007 | Yin et al. | 73/146.8 |
| 7,284,418 | B2 * | 10/2007 | Yin et al. | 73/146.8 |
| 7,395,702 | B2 * | 7/2008 | Qiu et al. | 73/146.8 |

* cited by examiner

*Primary Examiner*—Lisa M Caputo
*Assistant Examiner*—Jermaine Jenkins
(74) *Attorney, Agent, or Firm*—Bacon & Thomas, PLLC

(57) ABSTRACT

A tire pressure gauge includes a housing, a tire pressure detection unit, an air valve, and at least two limit members. The housing has a lateral side and a chamber. The tire pressure detection unit is mounted in the chamber. The air valve is mounted to the housing, extending out of the chamber from the lateral side of the housing. The at least two limit members are mounted to the lateral side of the housing and located bilaterally at the air valve, each having an end surface to which the air valve is perpendicular. Accordingly, when the tire passes through the rough roadbed to be violently shocked or impacted, the tire pressure gauge of the present invention remains in original position because of positioning efficacy of the two limit members.

4 Claims, 4 Drawing Sheets

TIRE PRESSURE GAUGE WITH DISPLACEMENT LIMITING MEMBERS

BACKGROUND OF THE INVENTION

1. Field of the Invention

The present invention relates generally to a tire pressure gauge, and more particularly, to a well positioned tire pressure gauge.

2. Description of the Related Art

The conventional tire pressure gauge includes a housing, a control circuit board mounted inside the housing, and an eccentric switch electrically connected the control circuit board. An air valve is connected to a front side of the housing and is inserted into a valve receiving hole of the rim, having a threaded portion for threaded connection with a screw nut for further fixture to a rim. A sealant is fitted to the air valve and stopped against the sidewall of the valve receiving hole for superior airtight efficacy. When a car starts to run and then keeps running, the eccentric switch of the tire pressure gauge is activated by the rotation of the rim for detection of the tire pressure.

However, the conventional gauge is fixed to the rim by only one screw nut and the housing of the gauge is suspended without any circumferential support. For this reason, when the car passes though the rough roadbed to cause violent shock of the rim or through the potholes on the roadbed to suffer sudden impact, the housing of the tire pressure gauge is subject to deviation from the original position, affecting not only the airtight efficacy between the sealant and the air valve but also the detecting efficacy of the eccentric switch. Under the circumstances, the tire pressure gauge fails to accurately detect the tire pressure.

SUMMARY OF THE INVENTION

The primary objective of the present invention is to provide a tire pressure gauge, which can be well positioned to remain in original position while a tire that the tire pressure gauge is applied is violently shocked or impacted.

The foregoing objective of the present invention is attained by the tire pressure gauge composed of a housing, a tire pressure detection unit, an air valve, and at least two limit members. The housing includes a lateral side and a chamber. The tire pressure detection unit is mounted in the chamber. The air valve is mounted to the housing, extending out of the chamber from the lateral side of the housing. The at least two limit members are mounted to the lateral side of the housing and located bilaterally at the air valve, each having an end surface being perpendicular to an imaginary axle of the air valve. In light of the above structure, when the tire passes through the rough roadbed to be violently shocked or impacted, the tire pressure gauge of the present invention remains in original position because of positioning effect of the two limit members.

DETAILED DESCRIPTION OF PREFERRED EMBODIMENTS

Figure 1:
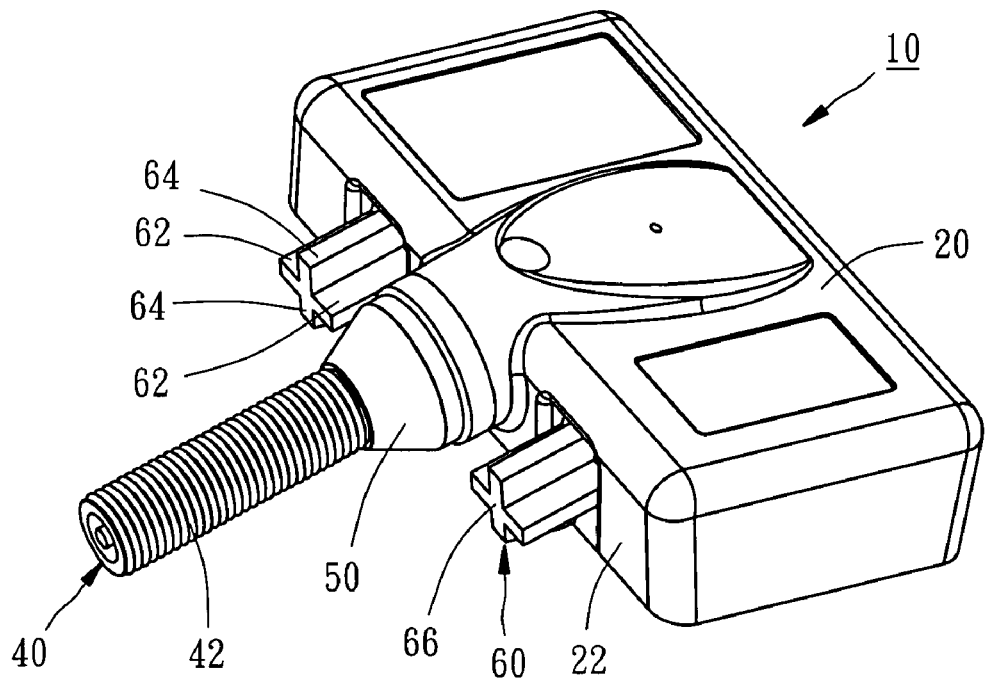
FIG. 1 is a perspective view of a first preferred embodiment of the present invention.
Figure 2:
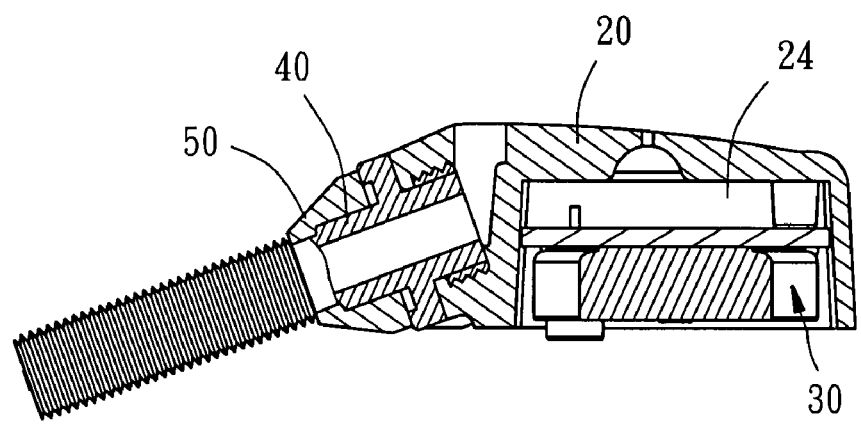
FIG. 2 is a lateral sectional view of the first preferred embodiment of the present invention.

Referring to FIGS. 1 and 2, a tire pressure gauge 10 is composed of a housing 20, a tire pressure detection unit 30, an air valve 40, a sealant 50, and two limit members 60.

The housing 20 is quadrangular to have six sides, one of which is an inclined front side 22 facing forward downward. The housing 20 includes a chamber 24 therein, as shown in FIG. 2.

The tire pressure detection unit 30 is mounted to the chamber 24 of the housing 20, having an eccentric switch (not shown) and a control circuit board (not shown) electrically connected with the eccentric switch.

Figure 3:
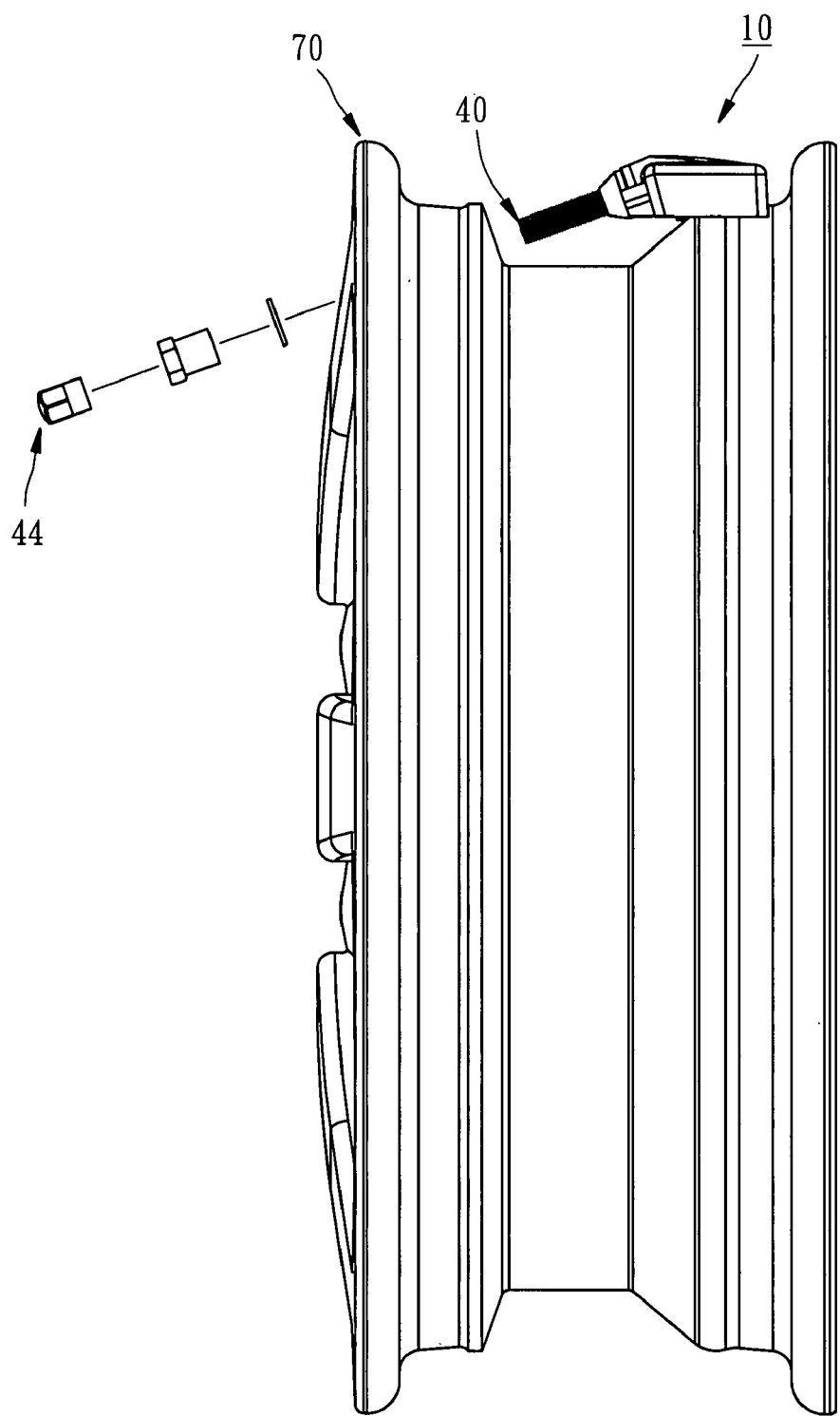
FIG. 3 is a schematic view of the first preferred embodiment of the present invention mounted to the rim.
Figure 4:
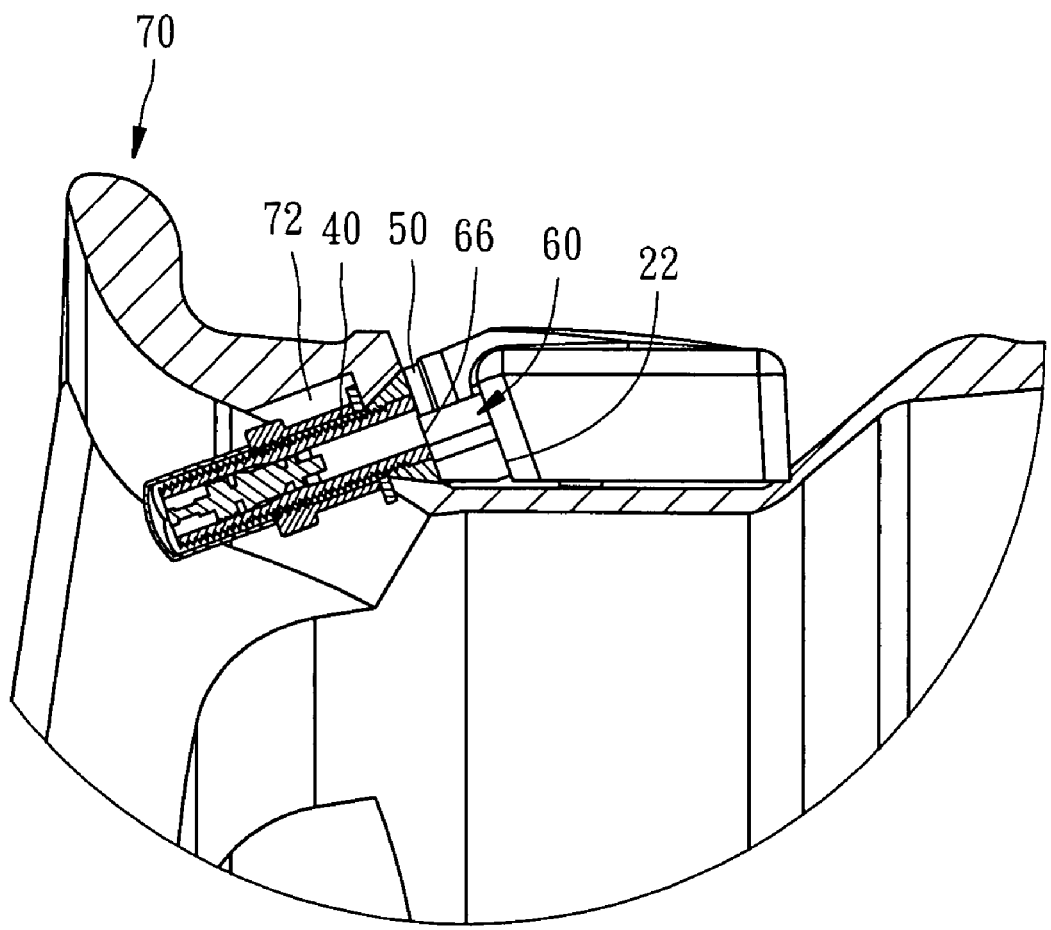
FIG. 4 is a sectional view of a part of the rim, to which the tire pressure gauge of the first preferred embodiment of the present invention is mounted.

The air valve 40 is connected with the housing 20, extending outward from the front side 22. The air valve 40 includes a threaded portion 42 for passing through the valve receiving hole 72 of the rim 70 and then being fixed to the rim 70 in such a way that a fastener 44 is screwed with the threaded portion 42, whereby the tire pressure gauge 10 is fixedly mounted to the rim 70, as shown in FIGS. 3 and 4.

The sealant 50 is made of rubber and is tapered to enable an outer diameter of a front end thereof to be smaller than that of a rear end thereof. The sealant 50 is fitted through the threaded portion 42 to a rear end of the air valve 40, having a rear end mounted to the housing 20. When the threaded portion 42 is inserted through the valve receiving hole 72, the sealant 50 can be plugged in the valve receiving hole 72 to closely seal the valve receiving hole 72 for superior airtight efficacy.

Each of the limit members 60 is made of plastic material and formed in one piece on the front side 22. The two limit members 60 are located bilaterally at the air valve 40. Each of the limit members 60 has a length between 1.5 mm and 2.5 mm. In this embodiment, each of the limit members 60 is 2 mm long, having a crossed section to define two sets of limit portions 62 and 64. Each set of the limit portions 62 and 64 has an end surface 66 parallel to the front side 22 and perpendicular to the air valve 40, as shown in FIG. 4.

Because the end surfaces 66 of the limit portions 62 and 64 are parallel to the front side 22 of the housing 20 and the air valve 40 is axially perpendicular to the end surfaces 66, when the fastener 44 is screwed with the threaded portion 42 of the air valve 40, the housing 20 is drawn toward the rim 70 to enable the end surfaces of the limit members 60 to contact against the rim 70. Under the circumstances, when the car whose tire the present invention is applied passes through the rough roadbed to cause violent shock of the rim or through the potholes on the roadbed to suffer sudden impact, the tire pressure gauge is confined by the limit members 62 and 64 to be pushed back to the original position as the housing slightly wobbles slightly leftward and rightward or upward and downward.

In light of the above structure, the present invention will not be forced to depart from the original position by the limit members, thus providing superior positioning efficacy.

Figure 5:
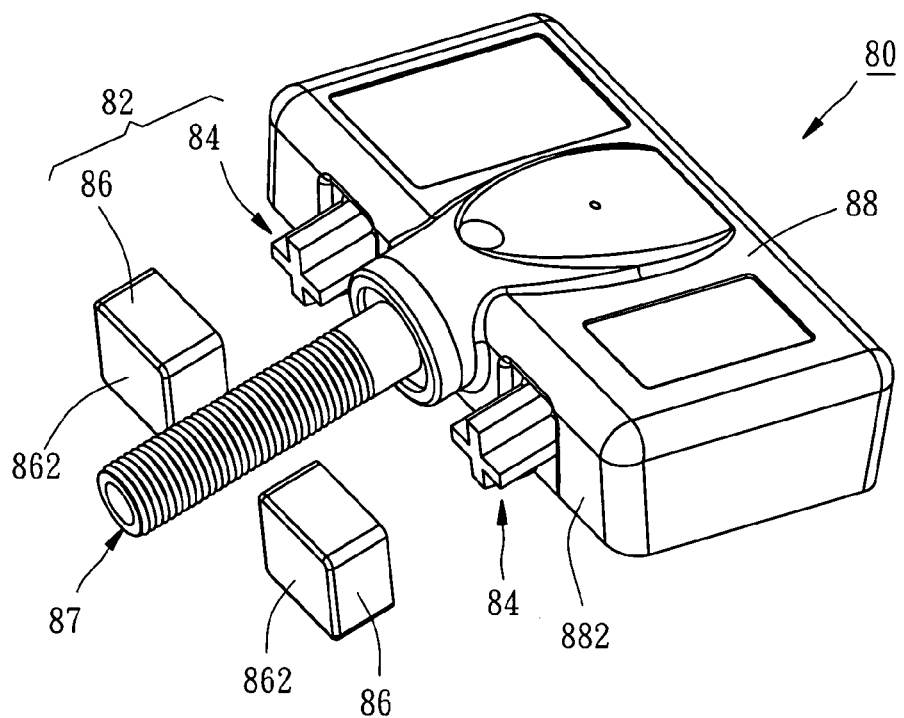
FIG. 5 is a partial exploded view of a second preferred embodiment of the present invention.
Figure 6:
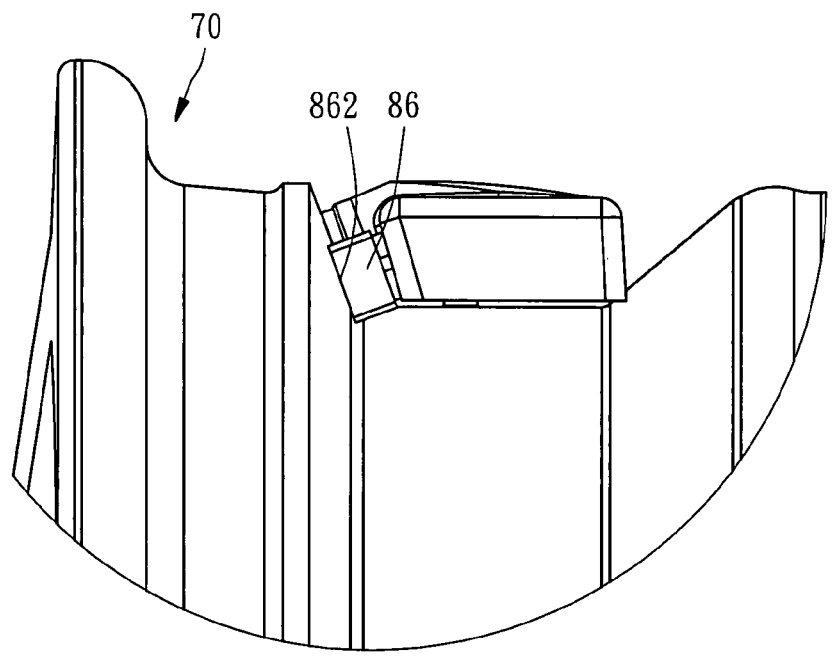
FIG. 6 is a side view of a part of the rim, to which the tire pressure gauge of the second preferred embodiment of the present invention is mounted.

Referring to FIG. 5, a tire pressure gauge 80 constructed according to a second preferred embodiment of the present invention is structurally similar to the first embodiment and different as recited below.

Each of the limit members 82 of the second embodiment includes a base part 84 and a limit cover 86 made of rubber. The base parts are formed in one piece on the front side 882 of the housing 88. The limit covers 86 each have an end surface 862 and are fitted onto the respective base parts 84 to enable the total length of the base part 84 and the limit cover to be larger than 2 mm. After the limit covers 86 are fitted onto the respective base part 84, the air valve 87 is axially perpendicular to the end surfaces 862 of the limit covers 86 and the end surfaces 862 are parallel to the front side 882 of the housing 88, such that the end surfaces 862 can contact against the rim 70.

In light of the above structure of the second embodiment, the rubber limit covers contact against the rim to enhance deformation of the limit members for more airtight efficacy between the sealant and the air valve. In addition, the rubber limit covers can increase friction between the limit covers and the rim for better positioning efficacy.

Although the present invention has been described with respect to specific preferred embodiments thereof, it is no way limited to the details of the illustrated structures but changes and modifications may be made within the scope of the appended claims.

What is claimed is:

1. A tire pressure gauge comprising:
    a housing having a lateral side and a chamber therein;
    a tire pressure detection unit mounted in said chamber;
    an air valve mounted to said housing and extending outward from said lateral side of said housing; and
    at least two limit members mounted to said lateral side of said housing and located bilaterally of said air valve,
    wherein each of said limit members comprises a base part and a limit cover, said base parts being mounted to said front side of said housing, said limit covers being mounted to said respective base part, said limit covers each having an end surface to which said air valve is axially perpendicular.

2. The gauge as defined in claim 1, wherein each of said limit members has an end surface parallel to said lateral side of said housing.

3. The gauge as defined in claim 1, wherein each of said limit members has a crossed section.

4. The gauge as defined in claim 1, wherein each of said limit members has a length between 15 mm and 2.5 mm.

* * * * *